No. 871,253. PATENTED NOV. 19, 1907.
C. W. BAUMAN.
MEASURING FAUCET.
APPLICATION FILED FEB. 20, 1906.
2 SHEETS—SHEET 1.
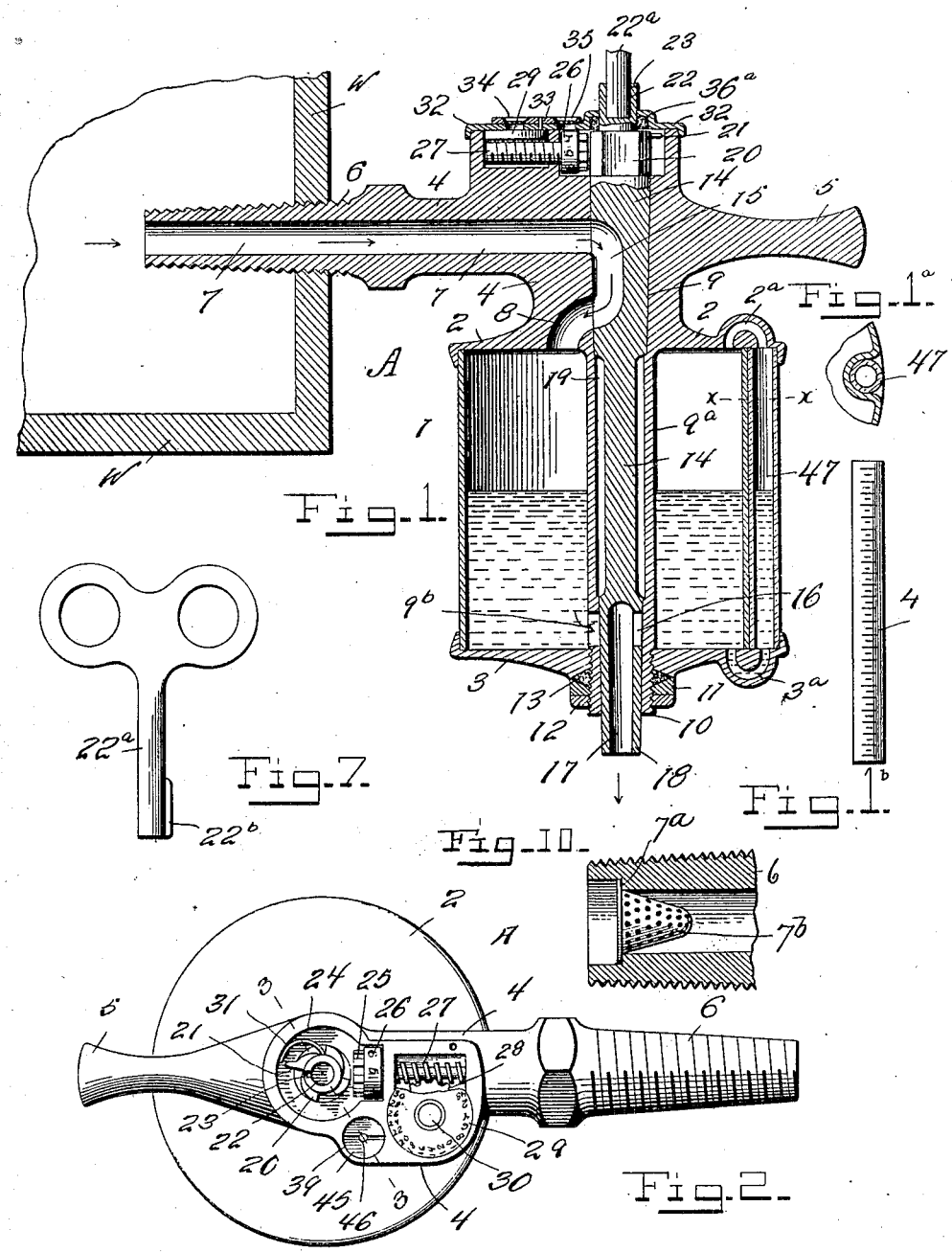

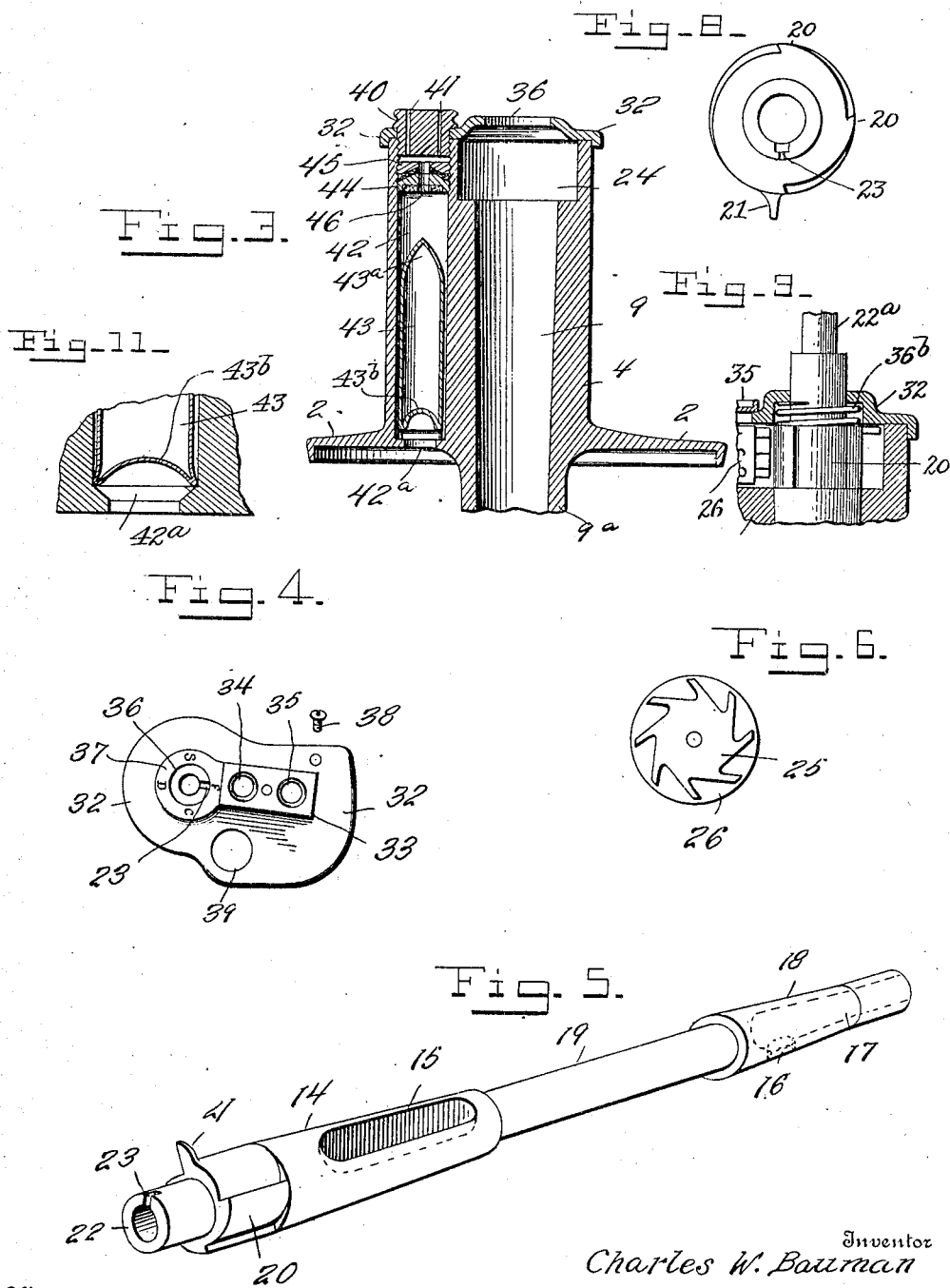

UNITED STATES PATENT OFFICE.

CHARLES W. BAUMAN, OF COLUMBUS, OHIO.

MEASURING-FAUCET.

No. 871,253.　　　Specification of Letters Patent.　　　Patented Nov. 19, 1907.

Application filed February 20, 1906. Serial No. 302,140.

*To all whom it may concern:*

Be it known that I, CHARLES W. BAUMAN, a citizen of the United States, residing at Columbus, in the county of Franklin and State of Ohio, have invented certain new and useful Improvements in Measuring-Faucets, of which the following is a specification, reference being had therein to the accompanying drawing.

This invention relates to a measuring faucet and vessel for transferring liquid from a storage tank or barrel, to a jug or other receptacle.

The object of my invention is to provide improved devices for dispensing and measuring liquids, and at the same time registering the quantity drawn from the storage tank or reservoir, by means of which wines, oils, and other liquids may be quickly and accurately transferred from a storage tank or barrel and a record made of the quantity transferred by means of suitable registering mechanism, so that the operator may know the whole quantity drawn from the storage tank, and the quantity remaining therein.

Another object of my invention is to provide for drawing off or dispensing an exactly measured quantity of liquid without the use of a separate, or hand measuring utensil and to make it impossible for a careless attendant to leave the parts of the device in such position that the contents of the storage tank or barrel will drain off and be wasted.

The matter constituting my invention will be defined in the claims.

I will now describe the details of construction and the operation of my improved device by reference to the accompanying drawings, in which Figure 1 represents a vertical section of the measuring faucet, showing part of the registering mechanism. Fig. 1$^a$ is a cross-sectional view taken on the line $x$—$x$, Fig. 1. Fig. 1$^b$ is an elevation of the gage glass, detached. Fig. 2 represents a top plan view thereof with the top plate removed and parts broken away. Fig. 3 represents a vertical section, on enlarged scale, taken on line 3—3, Fig. 2. Fig. 4 represents a top plan view of the top plate or cover of the registering mechanism. Fig. 5 represents a perspective view, on enlarged scale, of the double faucet plug, or key plug. Fig. 6 represents an end view, on enlarged scale, of a ratchet and register disk. Fig. 7 represents an elevation of the key for turning the faucet plug. Fig. 8 represents a top plan view of the faucet plug, showing a slight modification. Fig. 9 represents a sectional view of the upper end of the plug and its casing, showing a compression spring. Fig. 10 represents a sectional view showing a modified construction of the spigot. Fig. 11 represents a sectional view, on enlarged scale, of the lower end of the float chamber and float valve.

The measuring and dispensing device A is adapted to be attached by its spigot to a barrel or storage tank W, in a well-known manner.

The device is constructed with a measuring vessel composed, preferably, of a cylindrical shell 1, the upper head 2 and the bottom plate 3, the head 2 having cast, or otherwise formed integrally therewith the upper casing 4, which is provided with a handle 5. A spigot 6 is extended horizontally from a part of the casing, preferably, in line with the handle 5 and is externally screw-threaded for convenient attachment to a tank or barrel and is provided with a passage 7 which may be brought into communication with the liquid passage 8 in the head 2, by means of a port in the double faucet plug, as shown in Fig. 1. The inner end of the spigot 6 is preferably bored out to form a shoulder 7$^a$ upon which is seated the flange of a conical, or other shaped, sieve or strainer 7$^b$, as shown in Fig. 10. This strainer serves to catch and hold coarse particles which might otherwise flow into the measuring vessel and obstruct its valve ports.

The head 2 and casing 4 are made with a central longitudinal passage or opening 9 and the head is provided with a downwardly extending tubular casing 9$^a$ which is adapted to extend through the bottom plate 3 and is provided with a screw-threaded end 10 which takes into a screw-threaded opening in plate 3 and has applied to it a securing nut 11 and a lock nut 12. The bottom plate and nut 11 are recessed to form a chamber which is filled with a packing 13. By means of this screw-threaded end and the nuts, the cylinder 1 is tightly clamped between the head 2 and plate 3. The joints at the head and bottom plate may be made tight in any suitable manner. The tubular casing 9$^a$ is provided near its lower end with an opening or port 9$^b$.

My double faucet plug, or key plug, 14, is made slightly tapering from above downward and is provided near its upper end with a longitudinally disposed groove or channel 15 which is adapted to register with the liquid passages 7 and 8 in the head and spigot, as shown in Fig. 1. Near the lower end the plug is provided with an outlet port 16 and a longitudinal passage 17 in the tapered lower end 18, the port 16 being adapted to register with the port $9^b$. The middle portion 19 of the plug is, preferably, reduced or cut away, as shown in Figs. 1 and 5, to lessen the frictional contact. The plug, near its upper end, may be provided with four long ratchet teeth 20, in the nature of eccentric projections, as shown in Figs. 2 and 5, and at the upper end of one of these teeth is provided a radial register pin or finger 21 for engaging a tooth of the ratchet wheel 25 at each revolution of the plug. Instead of four teeth 20 I preferably provide three teeth on the plug as shown in Fig. 8, omitting the tooth which is shown to the right and adjacent to the registering finger 21 in Figs. 2 and 5. This provides a wider space or arc of a circle in which the plug may be turned, either forward or backward without turning the registering devices. The operator may thus more easily draw a small amount of liquid out of the measuring vessel 1, with the outlet ports, $9^b$ and 16, open, and he need not need to be so careful about not turning the plug too far to permit it being turned back again without moving the registering devices and registering a flow of liquid from the storage tank W. The outer end of the plug, above teeth 20, is provided with a socket 22 for receiving an operating key $22^a$, Fig. 7, and the end has a notch 23 from which extends an interior groove for receiving a rib $22^b$ on the key. The notch 23 is intended to register with the letters C, D, F, and S, on the top plate 32, Fig. 4, to indicate the position of the plug and its ports in the casing. The upper end of casing 4 is provided with a recess 24, to the inner wall of which is secured a spring pawl 31, Fig. 2, adapted to bear upon the teeth 20 and prevent the plug from being turned backward. It is to be noted also, that the four ratchet teeth 20, Fig. 2, correspond to the four letters on the cover plate 32. The clicking noise made by pawl 31, as it drops from one tooth to the other, also indicates each quarter turn of the plug.

In a suitable recess of casing 4 is mounted the register disk, or wheel 26 and worm 27, and to the outer end of the disk is secured the ratchet wheel 25, Figs. 1 and 6. In a recess is also mounted a worm wheel 28 and a register dial 29 on a pin or stud 30. To the wheel 26 are applied numerals 1 to 8, a numeral for each tooth of the ratchet wheel 25. Numbers 2, 4, 6, 8, etc., up to 48 are also applied to the face of the dial 29. Of course, other sets, or combinations of numbers may be used on the wheel and dial. The worm wheel 28 and dial 29 are, preferably, made in one piece and the dial fits closely in a recess made therefor.

A top plate or cover 32, Fig. 4, is secured by a screw 38 to the top of casing 4 and is provided with an opening which is covered by a plate 33 containing sight openings and glasses 34 and 35. The plate 32 is also provided with an opening 36 for the upper end of the plug 14, which opening is surrounded by a flat ring 37 containing the indicating letters C, D, S, F, spaced at quarter arcs one from another, as shown in Fig. 4. The plate is also provided with an opening 39 which is closed by a screw cap 40, Fig. 3, containing vent openings 41. The cover plate 32 is also provided with an interior annular recess around opening 36 for receiving a packing ring $36^a$ as shown in Fig. 1, or, preferably, a coiled compression spring $36^b$, as shown in Fig. 9. This spring may be made of phosphor bronze, and bears upon the annular shoulder at the upper ends of teeth 20, and serves to take up the wear of the plug 14.

A vertical float chamber 42 is made in casing 4 adjacent to the plug opening 9 and is provided with an opening $42^a$ in the head 2. Within this chamber is placed a loose fitting hollow float valve 43, having a conical end $43^a$. Near the upper end of chamber 42 is secured by screw thread connection, a brass valve seat 44, having a leather lining at its under side, and above said valve seat is placed a clamp nut 45 with a packing between it and the seat. The valve seat and nut are provided with a central opening 46. The screw threaded cap 40, engaging with the interior screw thread of chamber 42, serves as a clamping nut to hold the top plate 32 in place.

The lower end of float-valve 43, Fig. 11, at the junction of the cylindrical wall and the concave bottom $43^b$ is slightly enlarged or flared outward, as compared with the body above, so as to make a close fit in its chamber and prevent the liquid from rushing through too fast when the vessel 1 fills up and so pass above the float before it closes on its seat 44. The concave, or cup-shaped bottom $43^b$ increases the lifting capacity of the float. The body of the float being smaller above its lower end permits air to flow in and the liquid to drain off rapidly when the port is opened.

The cylinder 1 of the measuring vessel is preferably provided with a longitudinal recess or groove into which is set a graduated gage glass 47 which connects at top and bottom with interior of the vessel by passages $2^a$ and $3^a$, respectively, in the head and bottom plate, as shown in Fig. 1.

The gage glass will be clamped between the head and bottom plate and a suitable packing will be used to make tight joints between the parts. This provides a neat and effective construction and the gage glass will be protected from injury.

In the arrangement of my invention herein illustrated the receiving vessel A is of a size to hold a quart. The register disk 26 is provided with eight teeth and corresponding numbers, and as the register dial 29 is so connected with the disk 26 as to be advanced one step at each complete revolution of the disk, and the numbers upon the dial increase by two, as such dial is intended to represent the number of gallons that have been drawn off through the measuring vessel.

The backing ratchet arranged at the upper end of the double faucet plug prevents the backward rotation thereof, thus preventing the use of the device without the proper operation of the register.

The operation of the device is very simple and can be readily managed by an attendant. When the indicating mark 23 on the upper end of the double faucet plug is moved to F, Fig. 4, the inlet port 15 of the plug will register with the passages 7 and 8, permitting liquid to flow into and fill the vessel 1. At the same time the outlet opening from the receiving and measuring vessel is tightly closed. As the plug is turned the lug 21 will engage with a tooth of the ratchet wheel 25, thereby turning the register and registering the amount of liquid which has flowed into the measuring vessel. The vessel being filled the plug may be turned a quarter revolution, bringing the notch 23 opposite the mark C when the parts may be left at rest, or the plug turned further if it be desired at once to draw off the contents of the vessel. When the mark 23 on the turning plug is opposite the mark C both the inlet and the outlet passages will be closed, there being then no communication between the vessel A and the storage tank or receptacle W and the discharge passage 17.

The mark D indicates the position to which the turning plug should be set when it is desired to discharge the vessel A. There is an intermediate position of the plug between that indicated by the letter D and that by the letter F, to which it is desirable the plug should be set after the contents of the receiving and measuring vessel have been drawn off and before it is desired to again fill the vessel. This is indicated by the letter S, and when the plug is set to this position the vessel A is tightly closed to both the storage tank and the outside air.

Having described my invention, what I claim, and desire to secure by Letters Patent, is—

1. A liquid measuring and dispensing device, comprising a measuring vessel having a tubular plug-casing extending through it and provided near its lower end with a port opening into the vessel, and having an upper head and casing provided with an inlet passage 7 and a passage 8 opening into the vessel, and a double faucet plug mounted in the said casing, having a longitudinally disposed channel in its upper portion arranged to connect the said passages 7 and 8 when the plug is turned in one position, and provided near its lower end with a longitudinal draw-off passage arranged to communicate with the port near the lower end of the plug-casing, substantially as set forth.

2. A liquid measuring and dispensing device comprising a measuring vessel having a bottom plate with an opening, a head provided with a plug opening and having a tubular casing extending down through the opening in the bottom plate, means engaging the lower end of the said tubular casing for clamping the head and plate together, and a double faucet plug in said head and casing having inlet and outlet passages, and the said head and tubular casing having inlet and outlet ports arranged to register with the passages of the plug.

3. A liquid measuring and dispensing device, comprising a measuring vessel having a head and casing provided with a plug opening, liquid passages and a recess, both the liquid passages and the recess communicating with the plug opening, a plug seated in the said opening and provided with suitable inlet and outlet ports and having at its upper end ratchet teeth and a lug, a pawl in the recess arranged to engage with the ratchet teeth, and a register also seated in the recess and arranged to be operated by the said lug, substantially as set forth.

4. In a measuring vessel the combination with a shell, and upper head and bottom plates having passages, of a gage glass between said head and bottom plates and in connection at top and bottom with said passages and means for connecting the said head and bottom plates and clamping the gage glass between them, substantially as described.

5. In a liquid measuring and dispensing apparatus, the receiving vessel comprising a shell with open ends, heads at the opposite ends of the shell for closing it, a tubular casing carried by one of the heads and extending through the other, means engaging with the said tubular casing for holding the heads towards each other, and a turning plug controlling both the inlet and the outlet openings of the said vessel, the said plug being mounted in said tubular casing and being removable therefrom without necessitating the removal of either of the heads of the measuring vessel.

6. In a liquid measuring and dispensing device, the combination of a measuring vessel having a head and casing provided with a plug opening and with a float chamber, a cover for that portion of the head and casing in which the said opening and chamber are formed, a float valve located in the float chamber, a perforated valve seat with which the float valve coöperates, and a screw-threaded cap adapted to pass through the cover and into the float chamber and operating to hold the cover in place, substantially as set forth.

7. In a liquid measuring and dispensing device, the combination of a top having an attaching spigot and a tubular plug-casing, these parts being of integral construction, a separate bottom plate perforated to permit the passage of the said tubular casing, an intermediate shell between the top and bottom plates, means engaging with the said tubular casing arranged to force the bottom plate against the lower edge of the intermediate shell, and a faucet plug seated in the said tubular casing arranged to control the flow to and from the device, substantially as set forth.

8. In a measuring and dispensing device, the combination of the receiving vessel provided with a tubular casing to receive a turning plug, and having a head constructed to receive a registering mechanism, a turning plug fitting the said casing and arranged to control the flow of liquid to and from the vessel, means carried by the plug for actuating a registering mechanism, and a registering mechanism supported by the said head of the vessel and arranged to be operated by the rotation of the plug, the latter being removable from the vessel without disturbing the registering mechanism, substantially as set forth.

In testimony whereof I affix my signature, in presence of two witnesses.

CHARLES W. BAUMAN.

Witnesses:
  F. C. COSEO,
  F. L. SESSIONS.